United States Patent [19]

Becker et al.

[11] Patent Number: 4,697,563

[45] Date of Patent: Oct. 6, 1987

[54] METHOD OF CONTROLLING THE OPERATION OF AN AUTOMOTIVE INTERNAL COMBUSTION ENGINE

[75] Inventors: Rüdiger Becker, Murr; Albrecht Clement, Kornwestheim; Gustav Virgilio, Winnenden; Hugo Weller, Oberriexingen, all of Fed. Rep. of Germany

[73] Assignee: Robert Bosch GmbH, Stuttgart, Fed. Rep. of Germany

[21] Appl. No.: 896,315

[22] Filed: Aug. 12, 1986

Related U.S. Application Data

[63] Continuation of Ser. No. 743,586, Jun. 11, 1985, abandoned.

[30] Foreign Application Priority Data

Jul. 12, 1984 [EP] European Pat. Off. ............ 84108179

[51] Int. Cl.$^4$ ................................................ F02P 5/14
[52] U.S. Cl. .................................. 123/421; 123/422; 123/339; 123/423
[58] Field of Search ............... 123/421, 417, 416, 410, 123/422, 423, 425, 480, 339

[56] References Cited

U.S. PATENT DOCUMENTS

| | | | |
|---|---|---|---|
| 3,935,845 | 2/1976 | Aono et al. ...................... | 123/422 |
| 4,367,711 | 1/1983 | Ikeura ............................. | 123/421 |
| 4,425,890 | 1/1984 | Yamaguchi ...................... | 123/422 |
| 4,445,479 | 5/1984 | Takakuwa et al. ............... | 123/422 |
| 4,508,075 | 4/1985 | Takao et al. .................... | 123/339 |
| 4,509,481 | 4/1985 | Nagumo et al. .................. | 123/421 |
| 4,519,038 | 5/1985 | Matsui et al. .................... | 123/422 |
| 4,520,783 | 6/1985 | Matsushita et al. .............. | 123/422 |
| 4,547,852 | 10/1985 | Kamifuji et al. ................. | 123/422 |

Primary Examiner—Raymond A. Nelli
Attorney, Agent, or Firm—Frishauf, Holtz, Goodman & Woodward

[57] ABSTRACT

A control unit (7) for an internal combustion engine (ICE) (1) in a motor vehicle includes a control parameter computation unit 6 which provides output signals controlling the ignition instant of an ignition unit (5) and the fuel injection characteristics of the fuel injection unit 4, thereby controlling operation of the ICE. Depending on an operating parameter of the ICE (1), preferably load, the ignition angle is corrected by an ignition angle correction unit (11) by adding a correction factor, dynamically, as the load changes. The correction factor is determined, preferably, by sensing incremental changes in loading and, equally incrementally, changing the ignition angle, repetitively, as the loading changes. The method can be realized entirely by software within a known ignition angle correction unit (7).

3 Claims, 2 Drawing Figures

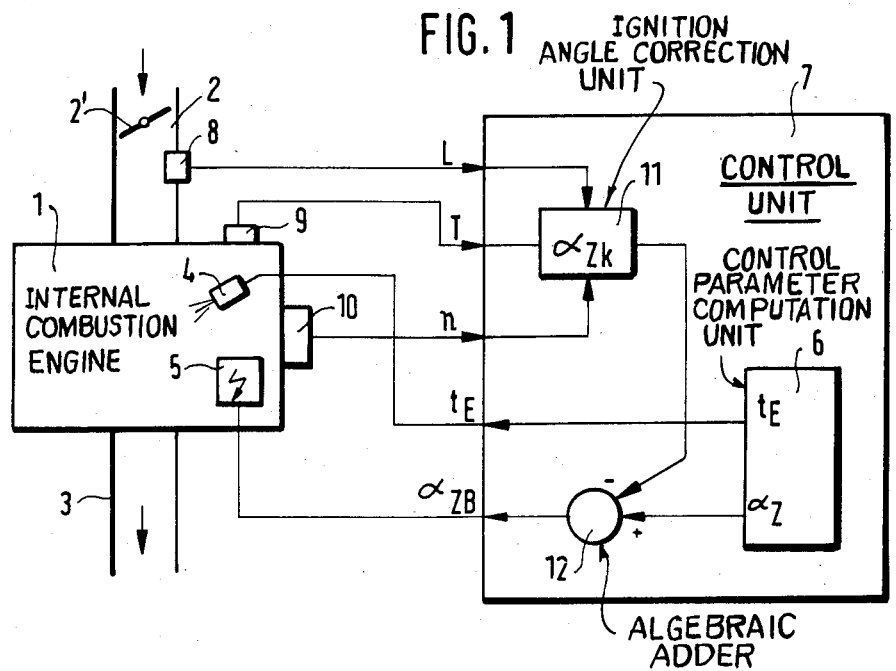
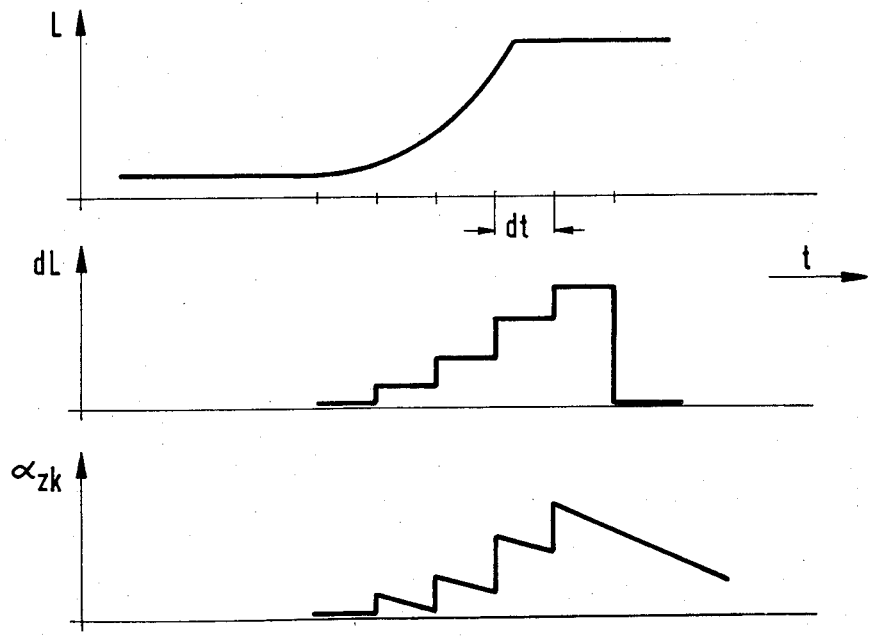

METHOD OF CONTROLLING THE OPERATION OF AN AUTOMOTIVE INTERNAL COMBUSTION ENGINE

This application is a continuation of application Ser. No. 743,586, filed June 11, 1985, now abandoned.

Reference to related publication, illustrating the State of the Art:

"Motronic—Kombiniertes Zünd— und Benzineinspritzsystem" ("Motronic—Combined Ignition and Fuel Injection System"), published by the assignee of the present application, Jan. 1983.

The system in the referenced literature is also described in U.S. Pat. Nos. 4,195,603, 4,267,813, 4,378,778, and 4,467,776.

The present invention relates to automotive vehicles, and more particularly to control an internal combustion engine driving an automotive vehicle, in which an electronic control system is provided which controls the ignition instant for igniting a combustible air-fuel mixture, and which, further, includes various sensors sensing operating parameters of the engine, such as loading on the engine, position of a throttle of the engine, temperature and the like.

BACKGROUND

The referenced publication "Motronic—Kombiniertes ZÜnd- und Benzineinspritzsystem" ("Motronic—Combined Ignition and Fuel Injection System"), published by the assignee of the present application, January 1983—describes a control apparatus for motor vehicles which includes an arrangement sensing acceleration of the engine and, upon determining that the engine accelerates, controlling the ignition instant—with respect to a reference position—such as top dead center (TDC) of a piston by changing the ignition advance angle and, further, providing for additional fuel to the fuel-air mixture.

If the throttle is opened abruptly, with the speed of the engine remaining constant, the air-fuel mixture will become leaner for a short period of time. In order to obtain good transition for smooth engine operation, with higher throttle opening, it is necessary to increase the fuel component of the fuel-air mixture. The control unit recognizes presence of acceleration, from the difference of the load signal which suddenly appears with respect to a prior signal, and, in such a case, increases the fuel component by enriching the fuel for acceleration. The air-fuel mixture may be controlled to a ratio of lambda=0.9, to obtain maximum torque. This prevents hesitation of the engine during acceleration.

The foregoing sequence occurs while the engine is warm. During the warm-up phase of the engine, however, the normal enrichment of the fuel for acceleration is insufficient. If the engine is cold, the enrichment must be increased due to the poor intermixing between fuel and air and possible condensation of liquid fuel on the intake manifold and/or the intake runner tubes. A temperature-dependent enrichment factor can be provided which is controlled, with respect to time, approximately linearly. The rate of change is independent of absolute temperature of the engine.

The control unit is capable of matching the ignition advance angle based on input information parameters of loading and speed at all times, by computing the proper ignition angle, in the interval between two ignition events. If a predetermined change in loading is exceeded, the control unit senses this excess and adds a fixed ignition angle, typically retardation angle, which, after first being added, is controlled with respect to the duration of its presence. This operation prevents knocking or pinging of the engine, which might, otherwise, occur for a few operating cycles or strokes of the engine if the ignition timing would be controlled only in accordance with its ordinary retardation function, and which, otherwise, might occur upon intense acceleration in some engines. Additionally, the high nitrogen-oxygen compounds in the exhaust gas which occur upon acceleration are reduced.

In those cases in which sudden and abrupt change of the ignition timing instant for the internal combustion engine (ICE) is commanded, a jolt or jerk may be sensed by the occupant of the vehicle. It is possible to avoid pinging of the engine, however, in those instances in which abrupt change is absolutely necessary, for example upon transition from partial loading. The control unit permits such fast change.

THE INVENTION

It is an object to improve the operation of a motor vehicle by controlling the internal combustion engine (ICE) thereof for smooth operation even under abrupt changes of operating conditions thereof, so that operating comfort of a vehicle driven by a so-controlled engine is improved.

Briefly, the various operating parameters of the engine are sensed, such as speed, loading and the like, and the extent or degree of change of ignition timing is controlled as a function of one or several selected operating parameters. Typically, the operating parameter is load and, preferably, also includes a factor inversely dependent on temperature.

The change in ignition timing, typically ignition retardation, can be continuous or the change in ignition angle can be triggered a plurality of times.

The control unit itself can be of standard construction, for example as known in the industry and described in the aforementioned literature reference. By changing the extent or degree of change of the ignition angle as the function of an operating parameter, the smoothness of operation of the engine, even under transient conditions, is improved, and, especially, upon various changes in rate of loading on the engine. Upon a small change in loading, only a small angular change of the ignition advance angle, typically in a retardation direction, is needed; upon substantial change in loading, however, a larger change in ignition angle is controlled. This prevents knocking or pinging of the engine, without, however, changing the optimum operating conditions of the engine in such a way that the engine operates too far from the limit at which it may have a tendency to knock or ping. Operating close to the knocking or pinging limit also improves the composition of exhaust gases in a direction of lesser air pollution.

The extent of ignition angle change can be made dependent on speed or, in general, on an operating point which is derived from a family of curves or a characteristic field relating loading and speed, and stored in a suitable memory portion of the control unit, typically a read-only memory (ROM). Thus, even at widely different speeds of the engine, the occupant-comfort is retained although, abruptly, acceleration may be commanded. Such sudden acceleration may be due to changes in terrain or traffic conditions.

In accordance with a preferred feature of the invention, the change in ignition angle is carried out repetitively; upon increase in change in loading, knocking is prevented without, however, changing the ignition angle, in the direction of retardation, for example, to an extent which would remove the operating characteristics of the engine too far from the knocking limit. Considering engine temperature as a function of the degree of change in ignition angle can be used to counteract the tendency to knocking, since the knocking tendency increases with increasing temperature of the engine.

DRAWINGS

FIG. 1 illustrates a block diagram of an internal combustion engine with a control unit therefor to control the operation of the engine; and FIG. 2, is a schematic diagram used in explaining the method and operation of the system of FIG. 1, in which all three graphs are drawn to a common time axis (abscissa).

DETAILED DESCRIPTION

An internal combustion engine 1 of an automotive vehicle has a fuel inlet or induction pipe 2, and an exhaust pipe 3. A control unit 7 is provided which controls a fuel injection unit 4, and an ignition unit 5. The induction or inlet arrangement 2 has a throttle 2' therein. A loading sensor 8, located downstream—with respect to air flow—of the throttle 2', and responsive, for example to air pressure or, rather, vacuum—in the induction arrangement of the motor—senses the loading on the motor and provides a load signal L to the control unit 7. A temperature sensor 9 senses the engine temperature, and provides a temperature signal T, and a speed sensor 10, coupled, for example, to the crankshaft of the ICE 1, provides a speed signal n to the control unit 7.

For simplicity of the drawing, the control unit 7 and the ICE 1 are shown only highly schematically, since the exact structure of the engine, the control unit, the fuel injection unit 4 and the ignition unit 5 are well known; the control of the respective elements 4, 5, by the control unit, likewise, is well known.

A subunit 6 for the engine, within the control unit 7, is separately shown. The subunit 6 computes a fuel injection interval or time, $t_E$, and provides an ignition signal at an ignition instant, based on an ignition angle $a_Z$. Engine controls of this type, likewise, are well known within the ICE control technology, and shown only in block diagram form.

An ignition angle correction unit 11 receives signals representative of engine loading and temperature, that is, signals L and T, as well as engine speed n and computes a correction factor $a_{Zk}$ which is applied to the output from the control parameter computation unit 6 which is directed to the ignition unit 5. The output from the ignition angle correction unit is connected to an algebraic adding circuit 12, receiving data representative of the ignition angle $a_Z$. The correction angle $a_{Zk}$ is subtracted from the ignition angle $a_Z$, as shown by the application of the signals to a respective negative and positive input of the adder 12, in order to determine the actual ignition angle $a_{ZB}$ during acceleration. The actual ignition angle $a_{ZB}$ is then applied from the control unit 7 to the ignition unit 5.

The control parameter computation unit 6, the ignition angle correction unit 11, and the algebraic adder 12 are, generally, contained with the control unit 7 as part of its software. The hardware of the control unit 7 includes input circuits for the respective signals L, T, n—and other signals if desired - and driver circuits for the output signals $t_E$ and $a_{ZB}$, controlling, respectively, the fuel injection unit 4 and the ignition unit 5. The control unit 7, further, includes the necessary hardware of a computer or calculating unit to process the information contained in the respective input signals to derive the desired output signals, based on the operating characteristics of the ICE 1, retained within the memory of the control unit 7, for example in the form of an ROM, which relates the various input data to the required output. The actual structure of the control unit 7, as shown in FIG. 1, thus represents the functional structure of the element to obtain the ignition angle change, in accordance with the present invention. Of course, the elements 6, 11, 12 could be actual separate hardware elements although, in most practical applications, they would be part of the software within the control unit 7.

FIG. 2 illustrates a load signal L with respect to time t. The rate of change of the load signal is variable, and has a rising rate characteristic. The control unit 7 interrogates, at suitable time intervals, shown schematically as dt, the level of the load signal L, and derives, therefrom, a respective signal shown in the second graph of FIG. 2. The second graph of FIG. 2 illustrates the signal dL which is the first derivative of the strobed load signal L of the first graph of FIG. 2. The derivative or differential signal dL, thus, is a measure for the rate of change of loading, that is, a measure for the speed of change in loading on the engine. The third graph of FIG. 2 illustrates the associated correction to the ignition angle, $a_{Zk}$, calculated in the ignition angle correction unit 11—or, preferably, the associated software in the control unit. The third graph starts with the signal dL (second graph) and, after each positive flank, the angle is changed downwardly, approximately linearly with respect to time—as is well known in the technology relating to control of ICEs. Rather than proceeding in accordance with standard control technology, however, the rate of change is calculated repeatedly and a repetitive ignition angle correction is carried out, although a preceding correction of the angle has not yet been completely controlled to its prior state. Consequently, correction of the ignition angle is carried out dynamically and not only once in dependence on exceeding a fixed loading threshold or change in loading. Such a fixed threshold may be represented, for example, by the horizontal portion of the first or top graph of FIG. 2, to the right of the rising curve; it may, alternatively, be formed by an intermediate predetermined threshold level.

We claim:

1. Method of dynamically and smoothly controlling the ignition angle, particularly under conditions of acceleration, in an automotive internal combustion engine having means (6, 12) for controlling the instant of ignition of a combustible mixture, with respect to a reference position (TDC) of the engine;

means (8) for sensing the engine load and providing a load-representative signal (L); and means (11) for changing the time of the ignition instant by steps with respect to the reference position, upon a change in load, and responsive to said load-representative signal (L), comprising the steps of sensing an operating parameter, namely load (L), of the engine;

and repetitively selecting a magnitude for each ignition instant change step as a function of the derivative (dL/dt) of said operating parameter and gradually reducing said magnitude at least until a subsequent change step, thereby obviating abrupt changes at low accelerations.

2. Method according to claim 1, wherein said means for controlling the instant of ignition includes a control parameter computation unit (6) and an algebraic adder (12);

said means for changing ignition instant time by steps includes an ignition angle correction unit (11) responsive to said means (8) for sensing engine load (L); and wherein said step of repetitively selecting a magnitude for each ignition instant change step comprises:
deriving an ignition angle in said control parameter computation unit (6),
deriving an ignition angle correction in said ignition angle correction unit (11),
combining said ignition angle and said ignition angle correction in said algebraic adder (12), and
coupling an output from said adder (12) to the engine (1).

3. Method according to claim 2, further including the step of
substantially increasing the value of said ignition angle correction at each rising or positive flank of the derivative of said load-representative signal, and thereafter decreasing said value approximately linearly with respect to time.

* * * * *